United States Patent [19]

Todd, Jr.

[11] Patent Number: 5,527,552
[45] Date of Patent: Jun. 18, 1996

[54] LIPID-SOLUBLE GREEN TEA CATECHIN ANTIOXIDANT SOLUTIONS

[75] Inventor: Paul H. Todd, Jr., Kalamazoo, Mich.

[73] Assignee: Kalamazoo Holdings, Inc., Kalamazoo, Mich.

[21] Appl. No.: 352,439

[22] Filed: Dec. 9, 1994

Related U.S. Application Data

[63] Continuation of Ser. No. 41,494, Apr. 1, 1993, abandoned.

[51] Int. Cl.$^6$ .................................................. A23B 4/00
[52] U.S. Cl. .......................................... 426/541; 426/545
[58] Field of Search ................................. 426/541, 545, 426/601, 610; 549/399

[56] References Cited

U.S. PATENT DOCUMENTS

| | | | |
|---|---|---|---|
| 3,451,823 | 6/1969 | Mishkin et al. | |
| 3,812,266 | 5/1974 | Sanderson et al. | |
| 4,166,861 | 9/1979 | Bonati et al. | 424/278 |
| 4,613,672 | 9/1986 | Hara . | |
| 4,673,530 | 6/1987 | Hara . | |
| 4,839,187 | 6/1989 | Mai et al. | |
| 4,840,966 | 6/1989 | Hara et al. | |
| 4,891,231 | 1/1990 | Mai et al. | 426/52 |
| 4,925,681 | 5/1990 | Mai et al. | 426/52 |
| 5,079,016 | 1/1992 | Todd, Jr. | 426/250 |

FOREIGN PATENT DOCUMENTS

| | | |
|---|---|---|
| 62-153385 | 7/1987 | Japan . |
| 63-135483 | 6/1988 | Japan . |
| 93/00015 | 1/1993 | WIPO . |

OTHER PUBLICATIONS

JPO Abstracts, Abstracting JP 62–81303, Abstract Publication date Sep. 11, 1987.
JPO Abstracts, Abstracting JP–61–130285, Abstract Publication Date Jun. 18, 1986.
JPO Abstracts, Abstracting JP–01–268683, Abstract Publication Date Oct. 26, 1989.
JPO Abstracts, Abstracting JP–04255792, Abstract Publication Date Sep. 10, 1992.

*Primary Examiner*—Leslie Wong
*Attorney, Agent, or Firm*—The Firm of Gordon W. Hueschen

[57] ABSTRACT

The water-soluble and fat-insoluble polyphenolic antioxidants (catechins) present in green tea are made into solution in an edible nonionic lipid-soluble solvent for the tea catechins selected from the group consisting of a fatty alcohol containing 8 to 18 carbon atoms, inclusive, preferably 12 to 14 carbon atoms, inclusive, and a non-ionic surface active agent selected from the group consisting of glyceryl monooleate, liquid mono- and di-glycerides, acylated mono- and di-glycerides, benzyl alcohol, triacetin, caproic-caprylic acid polyglycerides, polysorbate, especially glyceryl monooleate, and mixtures thereof, which solutions are effective antioxidants in fats, oil, foods, and ingredients of foods without imparting undesirable flavors, aromas, and precipitates. Since it is known that tea polyphenols have positive effects on human health, the resulting stabilized lipids can be considered to have nutritional qualities superior to the same lipid stabilized with common synthetic antioxidants. Unexpectedly strong synergistic effects with other natural antioxidants and with phosphates are also shown.

22 Claims, No Drawings

LIPID-SOLUBLE GREEN TEA CATECHIN ANTIOXIDANT SOLUTIONS

The present application is a continuation of our prior-filed application Ser. No. 08/041,494 filed Apr. 1, 1993, now abandoned.

FIELD OF THE INVENTION

Green tea catechins as antioxidants, especially for fats, oils, foods, and ingredients of foods, in the form of a solution thereof in an edible non-ionic lipid-soluble solvent for the tea catechins selected from the group consisting of a fatty alcohol containing 8 to 18 carbon atoms, inclusive, preferably 12 to 14 carbon atoms, inclusive, and a non-ionic surface active agent selected from the group consisting of glyceryl mono-oleate, liquid mono- and di-glycerides, acylated mono- and di-glycerides, benzyl alcohol, triacetin, caproic-caprylic acid polyglycerides, polysorbate, especially glyceryl mono-oleate, and mixtures thereof.

BACKGROUND OF THE INVENTION AND PRIOR ART

Oxidation of fats, vegetable oils, carotenoids and their biologically active derivatives, Vitamin A, and of essential oils and other flavorings results in degradation of their quality, and is deleterious to foodstuffs containing the oxidized products.

The art shows many methods of inhibiting lipid oxidation by adding fat-soluble antioxidants to the substrate. The art does not show the stabilization of fats, oils, fatty foods and ingredients of foods employing green tea catechins in a form effective for such purpose.

Green tea is known to contain significant amounts of four catechins. Their structures are as follows:

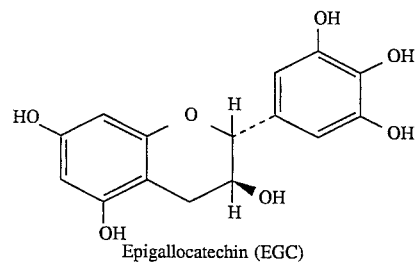
Epigallocatechin (EGC)

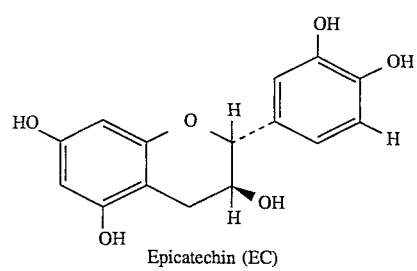
Epicatechin (EC)

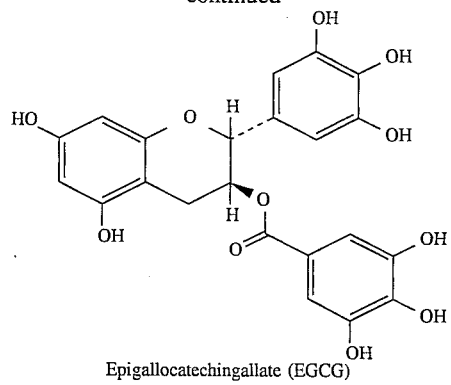
Epigallocatechingallate (EGCG)

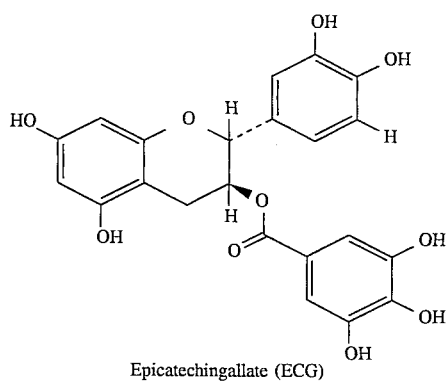
Epicatechingallate (ECG)

In the preparation of black or fermented teas, these catechins are partially or totally oxidized as shown by Sanderson, U.S. Pat. No. 3,812,266. The oxidized catechins are much less effective antioxidants, so that green tea is the preferred source of catechins for the product of this invention.

Hara, in U.S. Pat. No. 4,840,966, describes the therapeutic use of catechins to reduce blood pressure. They are administered orally in the form of tablets or incorporated into the diet. Other health benefits of green tea catechins are known.

Catechins are very soluble in water, and many patents have issued pertaining to methods of extracting them to make instant tea. Examples of such patents include Mishkin, U.S. Pat. No. 3,451,823. He describes a method of first extracting the tea with hot water, which will recover the catechins, and then reextracting with highly superheated water under pressure, to degrade and solubilize other tea materials, which may also have antioxidant properties. These undefined substances, of unknown toxicology, are not included in the preferred form of this invention.

Mai, U.S. Pat. No. 4,839,187, describes a process for making the superheated water extract of Mishkin into a composition effective for the stabilization of lipids. His process starts with black tea, not green tea, and the superheating creates gallic acid, which he considers an important component of his extract. It is not desired in, and not created in, the product and process of this invention, since it is known to develop purple colors in the trace presence of metals. His extract is directly added to the fat to be stabilized in a solid form, or mixed with lecithin. He does not show or suggest any lecithin solution or a method of obtaining such, which are important objects of this invention.

Although water extraction of the catechins is an acceptable method of separating the catechins from the tea, polar organic solvents, such as methanol and ethanol, may be used. Hara, U.S. Pat. No. 4,673,530, describes such an extraction using aqueous alcoholic solutions. These aqueous alcoholic extracts complicate the preparation of the preferred form of catechins used in this invention, since it has been found that interfering water-soluble substances are also extracted. These interfering substances are desirably removed if an extract of Hara's type is used. The use of essentially anhydrous solvents is preferred in this invention. The separation of caffeine, which is also present in the aqueous and organic extracts, can be achieved by conventional methods as described in the Hara patent, employing chloroform, leaving the catechins in the water phase and the caffeine in the organic phase. Hara then recovers the catechins from the water using ethyl acetate, without any adjustment of pH, and this solvent is then removed to give a powder.

Alternatively, the caffeine may be removed from the tea leaves by supercritical carbon dioxide extraction, as is done in the preparation of decaffeinated tea leaves. However, the separation of caffeine from the catechins is not necessary or even preferred in this invention, since it does not interfere with the antioxidant activity of the catechins in the lipid. On the other hand, the elimination of the use of chloroform is an object of this invention.

Hara, in U.S. Pat. No. 4,613,672, describes an elegant method of preparation of purified individual catechins for use in pharmaceutical preparations. These products can be used as aqueous solutions, or as dried powders. He also shows that ethanolic solutions of these powders, when added to lipids, act as antioxidants.

Being insoluble in lipids and other non-polar solvents, concentrated solutions of catechins in vegetable oils cannot be prepared, and an aqueous solution will simply separate from the lipid to be stabilized. Ethanolic solutions are unstable in use. Likewise, dry powders do not go into solution in oil even with prolonged heating at over 100° C. and agitation, and are inefficient as antioxidants.

OBJECTS OF THE INVENTION

It is an object of the present invention to provide an antioxidant solution of tea catechins in a non-ionic and preferably non-toxic and edible fat-soluble solvent for the tea catechins, a method of producing the same, a method for stabilizing a fat, oil, fatty food, or fatty food ingredient therewith, and such stabilized products. A further object is to provide the foregoing wherein the solvent is a fatty alcohol, a non-ionic emulsifier or surface-active agent, or lecithin. Another object of the invention is the provision of a clear solution of tea catechins and lecithin or a surface-active agent and a method of producing the same. An additional object is the provision of synergistic combinations of such tea catechin solutions and natural or synthetic antioxidants. Additional objects of the invention will become apparent hereinafter, and still other objects will be obvious to one skilled in the art to which this invention pertains.

THE INVENTION

The water-soluble and fat-insoluble polyphenolic antioxidants (catechins) present in green tea are made into solutions in a nonionic edible fat-soluble solvent which is a solvent for the tea catechins and which solutions are effective antioxidants in fats, oil, foods, and ingredients of foods without imparting undesirable flavors, aromas, and precipitates. Since it is known that tea polyphenols have positive effects on human health, the resulting stabilized lipids can be considered to have nutritional qualities superior to the same lipid stabilized with common synthetic antioxidants. Unexpectedly strong synergistic effects with other natural antioxidants and with phosphates are also shown.

The present invention provides a concentrated solution form of tea catechins which is completely soluble in oil. It provides maximum utilization of the antioxidant properties of the catechins.

Therefore, the preferred form of this invention utilizes the water-soluble and fat-insoluble constituents of the tea extract as a lipid antioxidant, and preferably discards the fat-soluble portion of the tea extract. In the less preferred form, the fat-soluble portion may be present, with or without chlorophyll.

The products of this invention are effective in stabilizing foods containing lipids, such as pie crusts, snacks, dressings, meats, pastries, and similar foods, as well as food ingredients such as breadings, flavorings, and colorings.

SUMMARY OF THE INVENTION

My invention then comprises, inter alia, the following, individually or in combination:

A solution of green tea catechins in an edible non-ionic lipid-soluble solvent for the tea catechins selected from the group consisting of a fatty alcohol containing 8 to 18 carbon atoms, inclusive, preferably 12 to 14 carbon atoms, inclusive, and a non-ionic surface active agent selected from the group consisting of glyceryl mono-oleate, liquid mono- and di-glycerides, acylated mono- and di-glycerides, benzyl alcohol, triacetin, caproic-caprylic acid polyglycerides, polysorbate, especially glyceryl mono-oleate, and mixtures thereof, and such solution essentially free of tea lipids, and any such Further, a fat, oil, fatty food or food ingredient substrate stabilized against oxidation with such composition, such a stabilized substrate wherein the substrate includes a carotenoid, and a method of stabilizing a fat, oil, food, or food ingredient substrate which includes the step of introducing into the substrate such a composition as set forth in the foregoing, and such a method wherein the substrate includes a carotenoid.

METHODOLOGY AND DEFINITIONS

An art accepted method of measuring the antioxidant activity of a substance employs the Rancimat™ to ascertain the induction time of a given lipid using a given dose of the antioxidant, generally with 18 liters of air per hour blowing through the fat held at a constant temperature selected for the specific fat. The Rancimat measures conductivity of an aqueous solution which captures the volatile oxidation products formed as the fat oxidizes. The results are reported as the ratio of the induction time of the test sample to the control, the higher the ratio, the more stable the fat. The results correlate very well with other standard measures of rancidity development, such as the active oxygen method, organoleptic evaluations, and so forth.

GLOSSARY OF TERMS

This glossary describes abbreviations and other technical terms and apparatus which may sometimes be referred to in one way or another in this specification.

| Abbreviation | Technical Term |
| --- | --- |
| BHA | butylated hydroxy anisole |
| BHT | butylated hydroxy toluene |
| GMO | glycerol mono-oleate |
| SO | soy oil |

| Abbreviation | Technical Term |
|---|---|
| SMO | sorbitan mono-oleate |
| STO | sorbitan trioleate |
| SMS | sorbitan monostearate |
| 8-1-O | octaglycerol mono-oleate |
| 10-1-CC | decaglycerol mono-capric-caprylate |
| RM | rosemary extract, especially Herbalox ™ produce of Kalsec, Inc., Kalamazoo, Michigan |

Peroxide Value:

This is also a standard test for evaluation of the degree to which an oil has been oxidized.

Labiatae Extract:

The solvent extract of a Labiatae herb, and preferably rosemary, sage, or thyme, especially rosemary. The preferable form is that described in Todd U.S. Pat. No. 4,877,635, and standardized to an antioxidant strength of about twice that of BHT in soy oil, under the standard Rancimat™ conditions. It is commercially available in the form of Herbalox™.

Rancimat™:

An instrument which measures the induction time of an oleogenous substrate, usually at 120 degrees Celsius and at 18 liters of air per hour. This is an accepted methodology for determining relative strengths of preparations of antioxidants. The effectiveness is expressed as the induction time of the sample divided by the induction time of the control, as a percent.

Synergism:

As defined in McGraw-Hill *Dictionary of Scientific and Technical Terms*: "An action where the total effect of two active components is greater than the sum of their individual effects."

Surface-Active Agent:

In the context of this specification, it represents a nonionic surface-active agent, especially one taken from the class consisting of:
a. mono and di glycerides of fatty acids,
b. polyglyceride esters of fatty acids,
c. mono and diglyceride esters further esterified with a dibasic organic acid taken from the class consisting of citric, lactic, and tartaric acids,
d. acetylated mono and diglyceride esters further esterified with a dibasic organic acid taken from the class consisting of citric, lactic, and tartaric acids,
e. sorbitan esters of fatty acids,
f. propylene glycol esters of fatty acids, and
g. lecithin, and equivalents thereof.
h. caproic-caprylic acid polyglycerides RM Rosemary Extract:

The extract used is Herbalox™, which is a commercial product available from Kalsec, Inc., standardized as to antioxidant activity, and comprising about 20% active antioxidant compounds.

DETAILED DESCRIPTION OF THE INVENTION

The following Examples are given by way of illustration only, and are not to be construed as limiting.

EXAMPLE 1

Preparation of the preferred form of green tea extract to be used in the lipid antioxidant preparations.

(a) Dried green tea leaves are exhaustively extracted with methanol substantially free of water, preferably less than about 7% to 9%. This is important to the improved process for making the catechins used in this invention. Ethanol or other lower alkanols, which azeotrope with water, are not the preferred solvent, but may be employed. (b) Methanol is removed from the extract, following the addition of sufficient water during the distillation for the purpose of keeping the mass liquid. The extract thus made at this point, if both water and solvent were removed, would be about 30% to 40% catechins, 10% caffeine, and 20% or more fat-soluble substances and pigments, including chlorophyll. (c) The extract is partitioned between the aqueous phase and a hydrocarbon solvent which boils below 200° C., preferably hexane. (d) The solvent layer is removed, the aqueous layer again partitioned against the hydrocarbon solvent to remove traces of lipids, and again separated. (e) The pH of the water layer is then adjusted to an acidic pH between 1 and 6, preferably 2.5 to 4.5, and optimally 3 to 4, and a water-soluble salt, preferably a non-toxic salt such as sodium or potassium chloride, sodium citrate, or sodium sulfate, added to a concentration of at least 0.2%, optimally between 5% and 30%, W/W of the water to salt out the catechins. (f) The catechins are then extracted from the water phase using ethyl acetate or other water-immiscible solvent preferably selected from lower alkanols, lower alkyl ketones, and lower-alkyl lower-aliphatic acid esters. (g) The ethyl acetate or other water-immiscible solvent solution is used as such, or desolventized to make a powder. These in turn are used to make the lipid antioxidant preparations of this invention. Steps (c) and (d) are essential only when all tea lipids are to be eliminated.

This general process was followed: 100 gms. of green tea was extracted with anhydrous methanol, enough water added to keep the mass liquid, methanol evaporated at a temperature below 80° C. to give a thick liquid extract, 90 ml of hexane added, the mixture agitated, the water-insoluble hexane phase separated from the water phase, the water phase again extracted with 30 ml of hexane, the hexane phase separated, 10 g of sodium chloride or other suitable salt added to the water layer and the pH adjusted to 3.5 with phosphoric acid, and the aqueous phase then extracted twice with 150 ml of ethyl acetate or other suitable water-immiscible solvent. The ethyl acetate was evaporated at a temperature below 80° C., yielding a dry solid catechin-rich fraction weighing 14.7 gms.

This preferred process differs from the prior art in requiring a substantially anhydrous lower alkanol, e.g., less than about 7% to 9% water being present in the alcoholic solvent, and most preferably less than 5%; the elimination of chloroform by the use of a hydrocarbon solvent, and criticality in adjusting the pH of the aqueous solution prior to ethyl acetate or other water-immiscible solvent extraction to between 1 and 6, and preferably 3 to 4, in the presence of a water-soluble salt for salting the catechins out of the aqueous phase. It goes without saying that the salt addition and pH adjustment can be carried out simultaneously or in either order.

While the foregoing is considered to be the preferred method of preparation of the water-soluble antioxidant fraction, variations suitable for specific equipment will be apparent to one skilled in the art. Although hexane is the preferred hydrocarbon solvent, other aliphatic hydrocarbons, such as heptane, and terpenes such as limonene, are acceptable.

Ethyl acetate can be replaced by other solvents which are immiscible with the aqueous phase, preferably selected from lower alkanols, lower-alkyl ketones, and lower-alkyl esters of lower-aliphatic acids, such as methyl ethyl ketone, acetone, butanol, and other lower aliphatic acid esters of lower alcohols such as isopropanol, e.g., isopropyl acetate, and the like.

EXAMPLE 2

Preparation and antioxidant properties of a fatty alcohol solution of tea catechins.

The dry powder of Example 1 was added to a C-12 fatty alcohol and warmed and agitated to give a 2.7% W/W solution of catechins. Since the C-12 alcohol is semi-solid at ambient temperatures, the solution is warmed with agitation to effect dissolution. It remains stable for more than one year. Since the C-12 alcohol is lipid in nature, being fat soluble and water insoluble, it is unexpected that the catechins should form a stable solution therein.

Other fatty alcohols, e.g., C-8 to C-18, may be used. However, above C-14, the melting points are inconveniently high for most applications, and below C-10 the coconut flavor becomes objectionable in many applications. Therefore C-12 to C-14 fatty alcohols are preferred.

The stabilizing effect of the 2.7% W/W solution was evaluated by adding 0.3% W/W to various oils and fats, to give 80 ppm catechins in the lipid. The induction times of the oils and fats were then compared with unstabilized oils using the Rancimat technique. Results are given in Table I.

TABLE I

Effectiveness of 80 ppm tea catechins dissolved in C-12 fatty alcohol in inhibiting oxidation of typical oils and fats, by Rancimat ratio of induction time to control.

| lipid | Rancimat Ratio |
| --- | --- |
| soy oil | 1.75 |
| corn oil | 1.50 |
| almond roasting oil | 2.10 |
| canola oil | 1.62 |
| peanut oil | 1.94 |
| palm oil | 1.58 |
| coconut oil | 4.68 |
| chicken fat | 5.05 |

While powerful in all the above substrates, the very great effectiveness at less than 100 ppm in coconut oil and poultry fat is particularly surprising, and best explained by the solubilizing effect of the fatty alcohol.

The dry powder of Example 1 used in the preparation of the C-12 solution was also evaluated. It was essentially insoluble in the soy oil, even with heating and agitation, at the level of 80 ppm catechins present in the solutions of Table I. It had a Rancimat ratio of 1.25 as compared to 1.65 for the same concentration of catechins when added in the fatty alcohol, even though heated with agitation to 120° C. in an attempt to effect dissolution. The powder is clearly relatively ineffective.

EXAMPLE 3

Effectiveness in lard, and synergistic mixtures.

A 2.7% W/W solution of catechins in C-12 fatty alcohol was made by evaporation of an ethyl acetate solution from Example 1 in the presence of the fatty alcohol. It was added to lard to give 27 ppm catechins in solution in the lard.

The Rancimat ratios of this lard, and the lard containing other natural antioxidants, was measured. Synergism is shown when the combined effect of the two antioxidants is greater than that obtained by addition of the two alone.

Results are shown in Table II, which include less than 38 micron ascorbic acid as described in my copending application Ser. No. 07/717,926, filed Jun. 20, 1991 and now U.S. Pat. No. 5,230,836, issued Jul. 17, 1993 and in my published PCT application WO 93/00015 published Jan. 7, 1993, and less than 38 micron phosphate particles, which are disclosed in the following Preparations as well as in my copending application U.S. Ser. No. 08/040,445, now abandoned.
Preparation Preparation of a suspension or dispersion of less than 38 micron sized phosphate particles in a medium in which they are insoluble.

(a) 318 g of sodium acid pyrophosphate and 1270 g of vegetable oil were added to a pebble mill and ground for 24 hours. The size of the particles in the dispersion was less than 38 microns on their largest dimension. A portion was withdrawn, and grinding continued until the particles were less than 10 microns on their largest dimension. While essentially all of the particles need to be less than 38 microns in size for this invention to be effective, it is preferred that they be less than 10 microns in size.

(b) The same procedure was used employing an approximately equal mixture of sodium acid pyrophosphate, sodium polyphosphates, and sodium ortho and metaphosphates, with the same results.

(c) A granular sodium acid pyrophosphate was ground in a mortar and pestle, and the powder sieved through a screen to separate particles less than 38 microns in size.

Potassium salts of the phosphates can be substituted for the sodium salts if sodium reduction is an objective.

The above products are representative food-grade phosphates of less than 38 micron particle size which are effective antioxidants in fats, oils, fatty foods, and ingredients of foods, especially when employed in the form of a suspension in an edible oleagenous medium such as the vegetable oil employed in the foregoing (a).

TABLE II

Synergism between tea catechins and other natural antioxidants.
Rancimat testing of tea catechins dissolved in fatty alcohol in lard.

| | ppm | Rancimat Ratio | % Synergism |
| --- | --- | --- | --- |
| (a) catechins | 27 | 4.78 | |
| (b) mixed tocopherols | 250 | 9.95 | |
| (c) <38 micron ascorbic acid | 400 | 2.17 | |
| (d) <38 micron sodium acid pyrophosphate | 200 | 1.55 | |
| synergistic mixtures | | | |
| a + b | | 17.0 | 20% |
| a + c | | 11.9 | 55% |
| a + d | | 6.92 | 27% |

It is clear that the catechins dissolved in the fatty alcohol provide synergistic properties when combined with the other antioxidants (b) through (d). Similar synergistic effects are found with Herbalox™ (a commercial rosemary extract made by Kalsec, Inc., which is representative of natural antioxidants extracted from herbs of the genus Labiatae) or other comparable thyme and sage extracts. Other synergistic combinations are attainable in the same manner as will be apparent to one skilled in the art.

Thus, powerful multiple synergistic effects can be achieved. In lard, for example, a mixture of 2.0 g of the 2.7% W/W catechin solution in C-12 alcohol, 4 g of Herbalox™, 0.75 g of mixed tocopherols, 5 g of 20% W/W mixed phosphates, and 5 g of 15% W/W ascorbic acid, the latter two being solids of less than 38 microns in size on their greasiest dimension, in vegetable oil, was dosed in at 0.165% W/W. The increase in induction time, over the sum of the increases in induction time if the constituents had been used alone, was over 250%, resulting in synergism greater than 150%.

When lecithin is added to the above mixture, so as to result in a dose in the lard of 0.18% W/W of the original mixture and 0.2% W/W lecithin, the induction time is further increased, demonstrating that non-ionic emulsifiers enhance the synergistic effect.

EXAMPLE 4

Resistance to discoloration with iron.

Propyl gallate, an approved synthetic antioxidant, is effective in animal fats but discolors them in the presence of iron, as does the gallic acid in the extracts of Mai and Mishkin. Since the catechins are gallic acid esters, it is to be expected that they will discolor fats in a similar fashion in the presence of iron. However, they do not, and even upon frying pork fat in an iron skillet, discoloration does not occur. This is unexpected, and makes this preparation suitable for use where propyl gallate is unacceptable.

EXAMPLE 5

Stability at elevated temperatures.

20 gms. of soy bean oil and of soy bean oil containing 500 ppm of a 2.7% W/W catechin solution in C-12 fatty acid (resulting in 1.4 ppm catechins in the oil) were placed in 50 ml beakers and held at 200° C. in a temperature-controlled oven, with air, for 30 minutes. The induction time, at a Rancimat temperature of 110° C., fell from 5.80 hours to 5.27 hours for the oil itself, and from 6.90 hours to 6..48 hours for the oil containing catechins. This shows that this preparation of catechins is surprisingly heat stable, and will be effective in frying fats at orders of magnitude considerably less than the 200 ppm of conventional synthetic antioxidants such as BHT and BHA now used, or their natural antioxidant replacements.

EXAMPLE 6

Improvement of shelf-life of vegetable oils.

Vegetable oils are commonly sold in the supermarkets in transparent containers. These are subject to oxidation due to both light and air once they have been opened and remain in the kitchen, and often become objectionably rancid before the bottle is emptied. This can be overcome by the use of the oil-soluble tea catechin solutions of the present invention.

Jars of Canola oil were purchased at the local market and opened. About one-fifth of the oil was withdrawn. To one jar, 14 ppm of catechins were added, using the C-12 preparation of Example 2. Both jars were then capped, and allowed to sit in normal room light for six months. They were then evaluated by a trained panel, which unanimously found the control rancid and the oil containing tea antioxidants to be fresh. The organoleptic difference was further reinforced by a finding that the control had a Rancimat induction time of 6.4 hours, as opposed to 7.89 hours; for the jar with the tea catechins. Peroxide values were also run on the two Canola oils, and were 13.8 for the control and 7.8 for the stabilized sample. No off flavor was detected in the jar containing tea catechins, either initially or at the end of the test.

Similar stabilizing effects were noted in other vegetable oils, the peroxide values of the test as a percent of that of the control after six months being: soy, 16%; corn, 56%, and a different sample of soy, 13%. Therefore, the tea catechins effectively prevented these oils from becoming rancid under stressed conditions for a period of six months.

This again demonstrates the totally-unexpected efficacy of the fatty alcohol catechin preparation of the present invention at less than one-tenth the normal dose of synthetic antioxidants, under the harsh conditions of commercial marketing and home use.

EXAMPLE 7

Other solubilizing agents for dosing into lipids; Synergistic Combinations.

While the fatty alcohols are preferred solubilizing agents, acceptable preparations for dosing into oil can be made using other specific classes of edible lipid-soluble solvents, particularly food grade non-ionic surface-active agents, especially glyceryl mono-oleate, liquid mono-diglycerides, acetylated monoglycerides, benzyl alcohol, lecithin, and triacetin (triacetyl glycerol). Polysorbates, although often prooxidant themselves, are also suitable carriers. Propylene glycol may be added to improve the liquidity of the solutions. However, unlike the fatty alcohols, solutions of catechins in these non-ionic solvent materials are less soluble in lipids and a maximum dosage is therefore about one-third that obtainable with the fatty alcohol solutions, and the oils are frequently hazy.

The preferred method of incorporation is to prepare a catechin solution in ethyl acetate or other co-solvent such as methanol or ethanol, add the solubilizing agent (solvent), and evaporate off the co-solvent. When this was done with lecithin, containing about 35% soy oil, a novel homogenous clear liquid was produced with a 2.7% W/W catechin content. It was very effective in lard, having a Rancimat ratio (110° C.) of 2.90 at 14 ppm catechins. This preparation advantageously has its viscosity reduced by the incorporation of a vegetable oil or a liquid non-ionic surface-active agent, and particularly glycerol mono-oleate or glycerol mono- or di-glycerides.

The same advantageous clear liquid solution is obtained when glyceryl mono-oleate is substituted for the lecithin.

Additional synergistic combinations follow:

Furthermore, the combination of lecithin, tea catechins in a C-14 fatty alcohol, and ascorbic acid of less than 38 micron particle size, to give levels of 0.2% W/W, 48 ppm, and 200 ppm respectively, resulted in a 39% synergism.

EXAMPLE 8

Stabilization of a carotenoid and food ingredient and food.

A composition consisting of oleoresin paprika (50%), soy bean oil (40%), and 10% of a 10% W/W solution of tea catechins in a polyglyceride of caproic and caprylic acids was dispersed on salt, as well as a control sample consisting of 50% oleoresin paprika and 50% soy bean oil. Each composition was dispersed on salt at a 2% W/W level, placed in an oven at 65° C., and the percentage of the original color of the oleoresin measured over time. The control lost one-third of its color in 30 hours, whereas the oleoresin containing the catechins required 132 hours to lose one-third of its color. This shows that the stability of the oleoresin paprika is increased by a factor of four, a very significant improvement. As a rule of thumb, one hour at 65° C. causes as much carotenoid loss as one day at room temperature, so the shelf life has been extended from about 30 days to 132 days, which is a very significant improvement commercially.

Paprika oleoresin contains a mixture of carotenoids, such as the hydrocarbons alpha and beta carotene, and oxygenated carotenoids such as lutein, zeaxanthin, and capsanthin, as well as minor constituents such as apocarotenals. The composition is also effective as an antioxidant for other carotenoids, such as bixin.

Not only is the stabilized oleoresin paprika, or other carotenoid composition, used as a food ingredient itself, but dispersions on salt, such as above, and on dextrose, breadings, and flours are often used in foods. Examples of applications of the catechin preparations are snacks, pet foods, vegetable oils and foods containing them, baked goods, and so forth.

Summary:

Novel oil-soluble solutions of tea catechins are described, as well as a method for their manufacture. These novel catechin solutions effectively retard oxidation and development of rancid aromas in vegetable oils and animal fats, even under stressed conditions, without imparting color, odor, or other objectionable flavor. Powerful synergistic combinations of this new form of tea antioxidant with other natural antioxidants and with phosphates are described. They are especially effective in inhibiting rancidity in lipid-containing foods and food ingredients.

It is thus seen that the present invention provides a novel and advantageous form of tea catechins and antioxidant solutions thereof, such products having increased antioxidant activity in fats, oils, carotenoids, and fatty foods and food ingredients, especially such materials and products as are exposed to oxidative stress, as well as a method of stabilizing such materials and products against oxidative discoloration, including foods, feeds, and foodstuffs which may encounter oxidative stress stabilized with a composition of the invention, and a method of stabilizing a food, feed, foodstuff, flavoring, or coloring with such a more effective form of catechin antioxidant composition of the invention. The stabilization of carotenoid pigments may thus advantageously be carried out. Synergistic effects are obtained by the incorporation of a natural antioxidant in such compositions, methods, and products, and the antioxidant effectiveness of the catechin antioxidant, antioxidant compositions, and method of the invention is further enhanced by inclusion of a natural Labiatae antioxidant, less than 38 micron ascorbic acid or phosphate particles, a tocopherol, or even a synthetic antioxidant such as BHA or BHT therein, and the antioxidant power and stabilization effectiveness of a composition of the invention may be even further improved by inclusion therein of a nonionic surface-active agent. All of the foregoing provide long-awaited solutions to previously-existing oxidation and instability problems not adequately solved by the prior art.

It is to be understood that the invention is not to be limited to the exact details of operation, or to the exact compositions, methods, procedures, or embodiments shown and described, as obvious modifications and equivalents will be apparent to one skilled in the art, and the invention is therefore to be limited only by the full scope which can be legally accorded to the appended claims.

I claim:

1. An antioxidant solution comprising green tea catechins dissolved in an essentially anhydrous edible non-ionic lipid-soluble solvent for the tea catechins selected from the group consisting of (a) a fatty alochol containing 8 to 18 carbon atoms, inclusive, and (b) a non-ionic surface active agent selected from the group consisting of glyceryl mono-oleate, liquid mono- and di-glycerides, acylated mono- and di-glycerides, benzyl alcohol, triacetin, caproic-caprylic acid polyglycerides, polysorbate, and (c) mixtures thereof.

2. A solution of claim 1 wherein the edible solvent comprises a fatty alcohol containing 8 to 18 carbon atoms, inclusive.

3. A solution of claim 2, wherein the fatty alcohol contains 12 to 14 carbon atoms, inclusive.

4. A solution of claim 2 which is essentially free of tea lipids.

5. A solution of claim 1 wherein the edible solvent comprises glyceryl mono-oleate.

6. A solution of claim 5 which is essentially free of tea lipids.

7. A fat, oil, fatty food or food ingredient substrate stabilized against oxidation with a solution of claim 1.

8. A fat, oil, fatty food or food ingredient substrate stabilized against oxidation with a solution of claim 1 wherein the edible solvent is a fatty alcohol containing 8 to 18 carbon atoms, inclusive.

9. A fat, oil, fatty food or food ingredient substrate stabilized against oxidation with a solution of claim 1 wherein the fatty alcohol contains 12 to 14 carbon atoms, inclusive.

10. A fat, oil, fatty food or food ingredient substrate stabilized against oxidation with a solution of claim 1 which is essentially free of tea lipids.

11. A fat, oil, fatty food or food ingredient substrate stabilized against oxidation with a solution of claim 1 wherein the substrate includes a carotenoid.

12. A fat, oil, fatty food or food ingredient substrate stabilized against oxidation with a solution of claim 5.

13. A fat, oil, fatty food or food ingredient substrate stabilized against oxidation with a solution of claim 5 which is essentially free of tea lipids.

14. A fat, oil, fatty food or food ingredient substrate stabilized against oxidation with a solution of claim 5 wherein the substrate includes a carotenoid.

15. A method of stabilizing a fat, oil, fatty food or food ingredient substrate which includes the step of introducing into the substrate a solution of claim 1.

16. A method of stabilizing a fat, oil, fatty food or food ingredient substrate which includes the step of introducing into the substrate a solution of claim 1 wherein the edible solvent is a fatty alcohol containing 8 to 18 carbon atoms, inclusive.

17. A method of stabilizing a fat, oil, fatty food or food ingredient substrate which includes the step of introducing into the substrate a solution of claim 1 wherein the fatty alcohol contains 12 to 14 carbon atoms, inclusive.

18. A method of stabilizing a fat, oil, fatty food or food ingredient substrate which includes the step of introducing into the substrate a solution of claim 1 which is essentially free of tea lipids.

19. A method of stabilizing a fat, oil, fatty food or food ingredient substrate which includes the step of introducing into the substrate a solution of claim 1 wherein the substrate includes a carotenoid.

20. A method of stabilizing a fat, oil, fatty food or food ingredient substrate which includes the step of introducing into the substrate a solution of claim 5.

21. A method of stabilizing a fat, oil, fatty food or food ingredient substrate which includes the step of introducing into the substrate a solution of claim 5 which is essentially free of tea lipids.

22. A method of stabilizing a fat, oil, fatty food or food ingredient substrate which includes the step of introducing into the substrate a solution of claim 5 wherein the substrate includes a carotenoid.

* * * * *

UNITED STATES PATENT AND TRADEMARK OFFICE
CERTIFICATE OF CORRECTION

PATENT NO. : 5,527,552
DATED : June 18, 1996
INVENTOR(S) : Paul H. Todd, Jr.

It is certified that error appears in the above-indentified patent and that said Letters Patent is hereby corrected as shown below:

Column 5, line 9: "produce" should read -- product --.

Column 9, line 3: "greasiest" should read -- greatest --.

Column 9, line 31: ""fatty acid" should read -- fatty alcohol --.

Column 9, line 63: "7.89 hours;" should read -- 7.89 hours --.

Column 11, line 62: "alochol" should read -- alcohol --.

Signed and Sealed this

Tenth Day of September, 1996

Attest:

BRUCE LEHMAN

*Attesting Officer*     *Commissioner of Patents and Trademarks*